United States Patent Office

2,925,442
Patented Feb. 16, 1960

2,925,442
PROCESS FOR THE OXIDATION OF ORGANIC SULFIDES

David W. Goheen and William M. Hearon, Camas, Wash., and Jonas Kamlet, New York, N.Y., assignors to Crown Zellerbach Corporation, San Francisco, Calif., a corporation of Nevada No Drawing. Application July 16, 1958
Serial No. 748,786

19 Claims. (Cl. 260—607)

This invention relates to a process for the oxidation of organic sulfides. More particularly, this invention relates to a cyclic process for the oxidation of organic sulfides in the liquid phase to the corresponding sulfoxides, employing nitrogen tetroxide as an oxidant, whereby the nitrogen tetroxide is reduced to nitrogen trioxide and thereafter converted back to nitrogen tetroxide for subsequent reuse, and the organic sulfoxide formed is separated from the reaction mixture. Inasmuch as the nature of the process of the present invention is such as to produce a certain amount of the corresponding sulfone, as a readily recoverable product in the formation of the organic sulfoxide, the preparation of organic sulfones is similarly claimed and contained within the scope of this invention.

The vapor-phase oxidation of dimethyl sulfide to dimethyl sulfoxide with an oxygen-containing gas in the presence of a catalytic amount of a nitrogen gas has been described by Smedslund in U.S. Patent No. 2,581,-050 (Jan. 1, 1952) and in U.S. Patents Nos. 2,825,744–5 (March 4, 1958). Wetterholm and Fossan (U.S. Patent No. 2,702,824 (February 22, 1955)) have described the liquid-phase oxidation of dialkyl sulfides to the corresponding dialkyl sulfoxides with an oxygen-containing gas in the presence of a catalytic amount of a nitrogen oxide. In each of these processes the nitrogen oxide is employed only in catalytic amounts in conjunction with oxygen or air.

It is the general object of the present invention to provide an economical and commercially attractive cyclic process for the oxidation of organic sulfides in the liquid phase to the corresponding sulfoxides and sulfones using nitrogen tetroxide as the sole oxidizing agent, which is reduced to nitrogen trioxide, the latter being readily regenerated to nitrogen tetroxide for reuse in the oxidation of further quantities of organic sulfides.

Other objects of this invention will be apparent to those skilled in the art from the following disclosure.

The basis of our invention may best be understood by a seriatim description of the various steps thereof:

(a) The organic sulfide is added to a solution of nitrogen tetroxide ($N_2O_4$) in an inert organic solvent for said $N_2O_4$, the amount of organic sulfide being not in excess of the equivalent of one mole of sulfur present as a thioether linkage in the organic sulfide for each mole of $N_2O_4$. Thus, in the case of organic sulfides containing two thioether groups in the molecule not more than one-half mole of said organic sulfide is added to each mole of $N_2O_4$ dissolved in said organic solvent. The $N_2O_4$ will thereupon readily oxidize the thioether group to the corresponding sulfoxide group, in good yield, and will itself be reduced to nitrogen trioxide ($N_2O_3$) which remains dissolved in the inert organic solvent. It is an essential feature of the process of this invention that the organic sulfide be added to the solution of the $N_2O_4$ in the organic solvent. If the reverse addition is effected (i.e. $N_2O_4$ solution added to the organic sulfide), the $N_2O_4$ is reduced as rapidly as added, to nitric oxide (NO). This nitric oxide (NO) is poorly soluble in organic solvents; because of its very low boiling point, it volatilizes immediately and is difficult to recover and recycle in the process. It is also an essential feature of this process that at least one mole of $N_2O_4$ be employed for each mole-equivalent of organic sulfide oxidized. Thus, the $N_2O_4$ is reduced to $N_2O_3$ (but not further to NO) which remains dissolved in the organic solvent and is thereafter easily regenerable to $N_2O_4$.

(b) After the oxidation is completed, the solution of $N_2O_3$ in the inert organic solvent is distilled and the distillate is condensed, in the presence of oxygen or an oxygen-containing gas present in or introduced into the condensing vessel. The oxygen-containing gas (which may be pure oxygen, air, mixture of oxygen and air, or mixtures of oxygen with other inert gases such as carbon monoxide or carbon dioxide) should be present in quantity at least sufficient to convert the $N_2O_3$ substantially completely to $N_2O_4$. The oxygen-containing gas may be present in the freeboard area of said condenser vessel, may be mixed with the distillate while it is still in the vapor phase or may be introduced into the distillate prior, during or subsequent to the condensation thereof. The oxidation of the $N_2O_3$ to $N_2O_4$ is rapid and substantially quantitative at the ambient temperature of the distillation and condensation. The regenerated $N_2O_4$ is recovered in solution of the condensed organic solvent. In this maner, the oxidizing solution of $N_2O_4$ in the organic solvent is quantitatively regenerated and recovered after each cycle, and may be reused continuously for the oxidation of successive batches of the organic sulfide.

It should therefore be emphasized that, whereas the processes of Smedslund and of Wetterholm and Fossan (cited above) employ nitrogen oxides in catalytic amounts only, in the presence of greater than stoichiometric amounts of oxygen, the process of this invention employs nitrogen tetroxide as the actual oxidant, in quantities at least stoichiometrically equivalent to the organic sulfide. The organic sulfide actually never comes in contact with the oxygen. The regeneration of the oxidant $N_2O_4$ solution is effected in a separate step, discrete from the sulfide oxidation step. Moreover, the cited prior art processes may use any nitrogen oxide (e.g. NO, $NO_2$, $N_2O_3$, etc.), as the catalyst whereas the process of this invention is specifically limited to the use of $N_2O_4$ in an inert organic solvent as the non-catalytic oxidizing agent, thereby preventing formation of free NO during the reaction.

The process of this invention is applicable to the oxidation of dialkyl sulfides (where the two alkyl groups are the same or different), alkylaryl sulfides, diarylsulfides, alkylaralkyl sulfides, alkylalkarylsulfides, diaralkyl sulfides, homocyclic and heterocyclic sulfides and the various substitution products thereof, to the corresponding sulfoxides. Similarly, the process of this invention is applicable to the conversion of organic sulfides containing two or more thioether groups in the molecule, to the corresponding organic di- and poly-sulfoxides.

Any organic solvent which will dissolve nitrogen tetroxide and is inert to chemical reaction therewith may be used in the process of this invention. Such solvents include saturated aliphatic hydrocarbons, such as petroleum ether, ligroine, Skellysolve solvent, Stoddard solvent, hydrogenated gasoline, kerosene, mineral oil, white oil, solvent naphtha, etc.; their halogenated derivatives, such as methyl chloride, methylene dichloride, chloroform, carbon tetrachloride, methyl bromide, dichlorodifluoromethane, etc.; aryl and alkylaryl hydrocarbons, such as benzene, toluene, xylene, etc.; and their halogenated derivatives, such as chlorobenzene, bromobenzene, chlorotoluene, etc. The preferred solvents for nitrogen tetroxide in the process of the present invention are saturated chlorinated aliphatic hydrocarbons, particularly methylene dichloride, chloroform and carbon tetrachloride. It should be noted, however, that the boiling point of the organic solvent employed should be below that of the organic sulfoxide formed during the reaction in order to insure an easy separation of the solvent from the mixture.

Although other solvents, such as the unsaturated chlorinated hydrocarbons (e.g. trichloroethylene) or the aliphatic ketones (e.g. acetone) will dissolve $N_2O_4$, they are unsuitable for use in the instant process since the $N_2O_4$ will react with such solvents causing considerable decomposition, degradation losses of the reagent and solvent during the recovery and regeneration of the oxidant.

In the process of this invention, a certain amount of the corresponding sulfone is obtained as a concomitant product in the oxidation of the sulfide to the sulfoxide. After distilling off the $N_2O_3$ and organic solvent, the residual organic sulfoxide and organic sulfone may be readily separated by a single distillation and fractionation, since these two products usually have widely separated boiling points at normal and reduced pressures.

The first step of the process of this invention may be effected over a wide range of temperatures, e.g. from as low as minus 30° C. to as high as the boiling point of the solvent for the nitrogen tetroxide at the ambient pressure. The second step of the process (i.e. the distillation and regeneration of the $N_2O_4$ solution in the condenser) is effected, of course, at and below the boiling point of the solvent employed at the ambient pressure. Both steps of the process may be effected at subatmospheric, atmospheric or superatmospheric pressures. However, no practical advantage is gained by working at other than atmospheric pressures. Thus, employing a solution of $N_2O_4$ in methylene dichloride, chloroform or carbon tetrachloride, we prefer to effect the first step of the process (i.e. the oxidation of the organic sulfide) at atmospheric pressure at a temperature of 10° C. to 30° C. The second step of the process is then effected by distilling off the $N_2O_3$ and the solvent at atmospheric pressure (e.g. at 40°–41° C. in the case of methylene dichloride), and thereafter condensing the solvent at a temperature below its normal boiling point in the presence of an oxygen-containing gas which regenerates the oxidizing solution.

The oxidation of the organic sulfide to the sulfoxide and the sulfone is very rapid and is usually complete in 2 to 5 minutes. The combined yields of organic sulfoxides and sulfones are very good, usually above 90% of theoretical.

As pointed out hereinabove, it is essential and critical that the $N_2O_4$ be employed in the presence of an inert organic solvent. The organic sulfide may be added as such, without prior solution in the said solvent or it may be dissolved in the solvent (preferably the same solvent as that employed for the $N_2O_4$) prior to its admixture with the oxidizing solution. The latter procedure may be found desirable since it helps to dissipate the heat of the reaction, to dissolve the reactants and the reaction products, and to dissolve the $N_2O_3$ and the $N_2O_4$ during the regeneration and recovery of these compounds.

The reactions of the organic sulfides with the $N_2O_4$ are moderately exotherim, e.g.

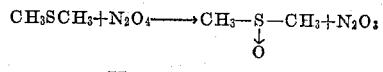

$$\Delta H = -27.7 \text{K. cal.}$$

and the use of the organic solvent further serves to moderate and dissipate this heat of formation.

The process of this invention is broadly applicable. Thus, it may be used to oxidize dimethyl sulfide to dimethyl sulfoxide. Dimethyl sulfoxide has a wide range of applicability as a solvent, in the manufacture of synthetic films and fibers, in the manufacture of paint and varnish removers, in the formulation of resin, wax and lacquer products, as a medium for gas recovery and separation, as a softener and humectant for cellulosic materials, as a reagent, reaction medium and diluent and for a host of other uses. The dimethyl sulfone formed by the process of this invention may be used as a solvent, chemical reagent and intermediate, as a diesel fuel additive, for selective gas separation, et cetera. This process may be also used to prepare methyl ethyl sulfoxide, methyl n-propyl sulfoxide, diethyl sulfoxide, methyl benzyl sulfoxide, tetramethylene sulfoxide, pentamethylene sulfoxide and a host of other organic sulfoxides and sulfones from the corresponding organic sulfides.

Thus, the process of this invention may be used to convert the methyl higher-alkyl sulfides to the corresponding methyl higher-alkyl sulfoxides (e.g. methyl decyl sulfoxide, methyl dodecyl sulfoxide) described by Webb in U.S. Patent No. 2,787,595, issued April 2, 1957, as being effective surfactants and detergent actives. Similarly, this process may be employed to convert the alpha, delta-di-thioethers (obtained by the catalyzed reaction of dimethyl disulfide with olefinic hydrocarbons) to the corresponding di-sulfoxides (e.g. 3-n-decyl-2,5-dithiahexane-bis-2,5-dioxide) described by Proell in U.S. Patent No. 2,658,038, issued November 3, 1953, as effective surfactants.

The sulfoxides obtained by the process of this invention may be analyzed by the method described by Ligault and Groves in Analytical Chemistry, 29, 1495–6 (1957).

The following examples are given to define and to illustrate this invention, but in no way to limit it to reagents, proportions or conditions described therein. Obvious modifications will occur to any person skilled in the art.

*Example 1*

In a three-necked flask equipped with an agitator, dropping funnel and reflux condenser fitted with a drying tube and connected to a Dry Ice trap, was placed 18.4 gms. $N_2O_4$ (0.25 mole) in 60 cc. chloroform. While the temperature was held at about 20° C., a total of 12.4 gms. of dimethyl sulfide (0.2 mole) in 20 cc. chloroform was added in four portions, with good agitation, taking about 2 minutes for the addition. The reaction mixture was stirred for an additional 2 minutes after the addition was completed and the solvent and $N_2O_3$ were then distilled off. A stream of oxygen was passed through the condenser during the distillation. Any gases not condensed were passed through the Dry Ice trap and the condensed products were returned to the distillation flask for a second passage through the condenser. The residue after the distillation was fractionated under reduced pressure. The fraction distilling at 74°–76° C. at 14 mm. Hg comprised 12.9 gms. of dimethyl sulfoxide (82.5% yield). The fraction distilling at about 118° C. at 14 mm. Hg comprised 1.5 gms. of dimethyl sulfoxide mixed with dimethyl sulfone (8.0% yield).

The distillate of chloroform containing regenerated $N_2O_4$ was treated with an additional 12.4 gms. of dimethyl sulfide, as above described. The yields of dimethyl sulfoxide and dimethyl sulfone obtained on fractionation were almost identical to those obtained previously.

*Example 2*

The procedure employed in Example 1 was repeated at 10° C. and using carbon tetrachloride as a solvent. Using a two minute addition time and additional agitation for two minutes, gave (from 18.4 gms. $N_2O_4$ in 60 cc. carbon tetrachloride and 12.4 gms. dimethyl sulfide in 20 cc. carbon tetrachloride) the following yields:

13.1 gms. of dimethyl sulfoxide (84.0% yield)
1.2 gms. of dimethyl sulfone (6.4% yield)

In each case, the procedure was repeated with the recovered and regenerated oxidizing solution, and substantially identical yields were obtained.

Example 3

In a reaction flask similar to that employed in Example 1 was placed 6.9 gms. of $N_2O_4$ (0.075 mole) in 40 cc. chloroform. A total of 12.0 gms. of methyl octyl sulfide in 30 cc. chloroform was added dropwise, with good agitation, over a period of 30 minutes, while maintaining the temperature at 22°–24° C. The solvent and oxidant were recovered and regenerated as in Example 1. On fractionation under reduced pressure, 10.5 gms. of methyl octyl sulfoxide (80% yield) was recovered at 130°–134° C./2 mm. Hg and about 2.0 gms. of methyl octyl sulfone (about 14%) could be recovered from the higher-boiling still residue.

On repeating the oxidation with the recovered and regenerated oxidizing solution, substantially the same yields were obtained.

Example 4

In a reaction flask similar to that employed in Example 1 was placed 23.0 gms. $N_2O_4$ (0.25 mole) in 100 cc. chloroform. 15.5 gms. of dimethyl sulfide (0.25 mole) in 100 cc. chloroform was added thereto dropwise, with good agitation over a period of an hour. The temperature was maintained at slightly below 25° C. by means of an ice-bath. The reaction mixture was stirred for an additional few minutes and the solvent and $N_2O_3$ were removed by distillation. On fractionation under reduced pressure, there were recovered 17.15 gms. of dimethyl sulfoxide (88.0% yield) and 1.7 gms. of dimethyl sulfone (9.0% yield).

Example 5

The procedure employed in Example 4 was repeated, maintaining the temperature during the oxidation at 30° C. From 18.4 gms. of $N_2O_4$, 12.4 gms. of dimethyl sulfide and 80 cc. of carbon tetrachloride, there were obtained:

13.0 gms. of dimethyl sulfoxide (83.5% yield)
2.9 gms. of dimethyl sulfone (15.5% yield)

Substantially identical yields were obtained with the recovered and regenerated oxidizing solution.

Example 6

In a reaction flask similar to that employed in Example 1 was placed 18.4 gms. $N_2O_4$ (0.2 mole) in 60 cc. carbon tetrachloride and, over a period of two minutes, while maintaining the temperature at 20° C., there was added 12.4 gms. of dimethyl sulfide (0.2 mole) with no solvent. The reaction mixture was stirred two minutes after completion of the addition and the solvent and $N_2O_3$ were then removed at the water-pump. The $N_2O_3$ was oxidized to $N_2O_4$ in the same manner as described in Example 1. The residue on distillation, gave:

12.66 gms. dimethyl sulfoxide (81.0% yield)
2.05 gms. dimethyl sulfone (10.9% yield)

This experiment was then repeated except that the solvent and $N_2O_3$ were removed at atmospheric pressure and oxygen was admitted to the condenser in order to oxidize the $N_2O_3$ back to $N_2O_4$. The yields were:

11.5 gms. dimethyl sulfoxide (73.7% yield)
4.2 gms. dimethyl sulfone (22.3% yield)

The yield of sulfoxide was reduced and that of the sulfone was increased due to the fact that some of the regenerated $N_2O_4$ was carried back into the oxidation flask by refluxing solvent during the distillation. The oxygen was admitted through the thermometer well of a Claison-type distillation head.

The solvent and regenerated $N_2O_4$ were reacted again with 12.4 gms. dimethyl sulfide and the solvent was again removed at atmospheric pressure, but no oxygen was introduced. The yields were:

12.4 gms. dimethyl sulfoxide (79.5% yield)
2.5 gms. dimethyl sulfone (13.3% yield)

Since no oxygen was introduced, no $N_2O_4$ was formed during concentration and thus none was carried back into the flask by refluxing solvent. Thus, an increased sulfoxide yield and a decreased sulfone yield were obtained.

Example 7

In a reaction flask similar to that employed in Example 1, 18.4 gms. of $N_2O_4$ (0.2 mole) in 60 cc. carbon tetrachloride was placed, and 12.4 gms. dimethyl sulfide (0.2 mole) added over a 5 minute period, keeping the temperature at 0°–5° C. The reaction mixture was agitated for 30 minutes, the solvent and $N_2O_3$ were then distilled off, and the residue fractionated. There were thus obtained.

12.7 gms. of dimethyl sulfoxide (81.0% yield)
1.9 gms. of dimethyl sulfone (10.0% yield)

Thus, the use of this lower temperature range and longer reaction period gives no increase in sulfoxide yield.

Example 8

In a reaction flask similar to that employed in Example 1 was placed 18.4 gms. of $N_2O_4$ (0.2 mole) in 60 cc. of methylene dichloride. To this solution 12.4 gms. of dimethyl sulfide (0.2 mole) was added over a two minute period at a temperature maintained at 20° C. After the mixture was stirred for an additional 2 minutes at 20° C., the solvent and $N_2O_3$ were distilled off at atmospheric pressure (40°–41° C.) and the residue fractionated to give:

12.7 gms. dimethyl sulfoxide (82.0% yield)
0.6 gm. dimethyl sulfone (3.2% yield)

The recovered and regenerated oxidizing solution was reused repeatedly to oxidize eight successive batches of dimethyl sulfide. Yields of 81.5% to 85.2% of dimethyl sulfoxide and 2.8% to 6.2% of dimethyl sulfone were obtained in each case.

Examples 9–15

The procedure employed in Example 8 was repeated to oxidize the following organic sulfides to the corresponding sulfoxides in the stated yields:

| Organic sulfide | Yield of corresponding sulfoxide, percent |
| --- | --- |
| methyl ethyl sulfoxide | 82.4 |
| methyl n-propyl sulfoxide | 84.2 |
| diethyl sulfoxide | 79.6 |
| methyl octyl sulfoxide | 80.4 |
| methyl benzyl sulfoxide | 68.8 |
| dibenzyl sulfoxide | 72.2 |
| methylphenylsulfoxide | 74.0 |

Example 16

In order to determine the effect of distilling off the $N_2O_3$ and the solvent at varying pressures, a solution containing one mole of $N_2O_4$ (in the form of a solution containing 16.7% $N_2O_4$ and 83.3% carbon tetrachloride) was cooled to minus 10° C., and one mole of dimethyl sulfide was added, with good agitation, permitting the temperature to rise to 30° C. during the addition. The $N_2O_3$ and carbon tetrachloride were then removed by distilling under reduced pressures at different temperature ranges (at 10° C. intervals) between 30° and 78° C. The following yields were obtained:

|  | 30°–40° C. | 40°–50° C. | 50°–60° C. | 60°–70° C. | 70°–78° C. |
| --- | --- | --- | --- | --- | --- |
| Dimethyl sulfoxide, percent | 70 | 82 | 84 | 87 | 88 |
| Dimethyl sulfone, percent | 3 | 6 | 12 | 10 | 11 |

In each case, the oxidizing solution of $N_2O_4$ in $CCl_4$ could be quantitatively regenerated by the introduction of oxygen into the condensing vessel.

Example 17

Methyl dodecyl sulfide was prepared by the reaction of methyl mercaptan with propylene tetramer in the presence of a catalytic amount of azo-bis-isobutyronitrile, as described by Webb in U.S. Patent No. 2,787,595.

In a reaction flask similar to that described in Example 1 was placed 18.4 gms. of $N_2O_4$ (0.2 mole) in 60 cc. of methylene dichloride. To this solution was added, in the course of ten minutes, 43.2 gms. of the methyl dodecyl sulfide (B.P. 140°–144° C./18 mm. Hg) (0.2 mole) while maintaining the temperature at 25° C. The reaction mixture was agitated for a further five minutes, and the $N_2O_3$ and solvent were then distilled off and regenerated in the same manner as described in Example 1.

The residue in the still solidified on cooling to a crystalline white solid, M.P. 50°–54° C., weighing 43.6 gms. and analyzing 92.4% methyl dodecyl sulfoxide.

Example 18

3-n-decyl-2,5-dithiahexane was prepared by the reaction of dodecene-1 and dimethyl disulfide in the presence of ethane-sulfonic acid as a catalyst, as described by Proell in U.S. Patent No. 2,658,038. In a reaction flask similar to that described in Example 1 was placed 18.4 gms. $N_2O_4$ (0.2 mole, i.e. one mole for each thioether linkage) in 60 cc. of methylene dichloride. To this solution was added, in the course of ten minutes, a total of 26.2 gms. of the 3-n-decyl-2,5-dithiahexane, while maintaining the temperature at 25° C. The reaction mixture was agitated for a further five minutes and the $N_2O_3$ and solvent were then distilled off and regenerated.

The residue in the still solidified on cooling in the refrigerator to a solid, M.P. 25°–28° C., weighing 26.6 gms. and analyzing 88% of 3-n-decyl-2,5-dithiahexane-bis-2,5-sulfoxide.

Example 19

In a reaction flask similar to that employed in Example 1, 18.4 gms. of $N_2O_4$ (0.2 mole) in 60 cc. of Skellysolve solvent (B.P. 69–96° C.) was placed, and 12.4 gms. dimethyl sulfide (0.2 mole) added over a period of about 3 minutes, keeping the temperature at about 20° C. The mixture was stirred for 3 minutes, the solvent and $N_2O_3$ were then distilled off at a reduced pressure at the water pump, and the residue was fractionated. The yields were:

13.3 gms. of dimethyl sulfoxide (85.2% yield)
1.6 gms. of dimethyl sulfone (8.5% yield)

Example 20

In a reaction flask similar to that employed in Example 1, 18.4 gms. of $N_2O_4$ (0.2 mole) in 60 cc. of xylene was placed, and 12.4 gms. dimethyl sulfide (0.2 mole) added. The reaction conditions, distillation of the solvent-$N_2O_3$ solution and fractionation of the residue were the same as in the Example 19. The yields were as follows:

10.1 gms. of dimethyl sulfoxide (64.8% yield)
3.8 gms. of dimethyl sulfone (20.2% yield)

Example 21

Following again the procedure described in Example 19, to 18.4 gms. of $N_2O_4$ (0.2 mole) in 60 cc. of chloro-benzene there was added 12.4 gms. of dimethyl sulfide (0.2 mole). The yields were:

12.6 gms. of dimethyl sulfoxide (80.8% yield)
1.5 gms. of dimethyl sulfone (7.8% yield)

Example 22

In a reaction flask similar to that employed in Example 1 was placed 46 gms. $N_2O_4$ (0.5 mole) in 150 cc. chloroform. 15.5 gms. of dimethyl sulfide (0.25 mole) in 100 cc. chloroform was added thereto dropwise with stirring over a period of 5 minutes. The temperature was allowed to rise to the boiling point of the reaction mixture. The reaction mixture was stirred and refluxed for 75 minutes, and thereafter the $N_2O_3$ and chloroform were distilled off. The yields were:

5.2 gms. of dimethyl sulfoxide (26.6% yield)
14.9 gms. of dimethyl sulfone (63.0% yield)

The above examples clearly illustrate the present invention and it will be obvious to those skilled in the art that other organic sulfides and organic solvents for nitrogen tetroxide than those described in the above examples may be employed.

Having thus described our invention, we claim:

1. A process for the oxidation of organic sulfides which comprises the steps of:

(a) adding an organic sulfide selected from the group consisting of dialkyl, alkylaryl, diaryl, alkylaralkyl, alkylalkaryl, diaralkyl, homocyclic, heterocyclic and at least two thioether groups in the molecule-containing sulfides to a solution of nitrogen tetroxide ($N_2O_4$) in an inert organic solvent for said nitrogen tetroxide, in an amount equivalent to at least one mole of nitrogen tetroxide for each mole-equivalent of sulfur present as a thioether linkage in said organic sulfide, oxidizing the organic sulfide to the corresponding sulfoxide and reducing the nitrogen tetroxide to nitrogen trioxide ($N_2O_3$), (b) distilling off the nitrogen trioxide and the inert organic solvent and condensing the distillate in the presence of an oxygen-containing gas in quantity at least sufficient to convert substantially all of the nitrogen trioxide to the nitrogen tetroxide and thereby regenerating the oxidizing solution of nitrogen tetroxide in the organic solvent, and (c) recovering the organic sulfoxide formed from the residue of the distillation, the boiling point of said organic solvent being below the boiling point of the sulfoxide formed during the reaction.

2. The process of claim 1 in which the inert solvent for the nitrogen tetroxide comprises a saturated chlorinated aliphatic hydrocarbon.

3. The process of claim 1 in which the inert solvent for the nitrogen tetroxide comprises at least one member of the group consisting of the saturated aliphatic and aromatic hydrocarbons and the saturated halogenated aliphatic and aromatic hydrocarbons.

4. The process of claim 1 in which the inert solvent for the nitrogen tetroxide is methylene dichloride.

5. The process of claim 1 in which the inert solvent for the nitrogen tetroxide is chloroform.

6. The process of claim 1 in which the inert solvent for the nitrogen tetroxide is carbon tetrachloride.

7. The process of claim 1 in which the corresponding organic sulfone is recovered from the oxidation product after the separation of the organic sulfoxide.

8. The process of claim 1 in which the oxidation of the organic sulfide by the nitrogen tetroxide in the organic solvent is effected at a temperature between minus 30° C. and the boiling point of the solvent at the ambient pressure.

9. The process of claim 1 in which the distillation and regeneration of the oxidizing solution of the nitrogen tetroxide in the organic solvent is effected at a temperature not in excess of the boiling point of said solvent at the ambient pressure.

10. The process of claim 1 in which the oxidation of the organic sulfide by the nitrogen tetroxide in the organic solvent is effected at a temperature between 10° C. and 30° C.

11. The process of claim 1 in which the oxidation of the organic sulfide, the distillation and the regeneration of the oxidizing solution of the nitrogen tetroxide in the organic solvent is effected at atmospheric pressure.

12. The process of claim 1 in which the oxidizing solution of nitrogen tetroxide in the organic solvent is regenerated by the introduction of oxygen.

13. The process of claim 1 in which the oxidizing solution of nitrogen tetroxide in the organic solvent is regenerated by the introduction of air.

14. The process of claim 1 in which the organic sulfide is dimethyl sulfide and the organic sulfoxide is dimethyl sulfoxide.

15. The process of claim 7 in which the organic sulfide is dimethyl sulfide and the organic sulfone is dimethyl sulfone.

16. The process of claim 1 in which the organic sulfide is methyl octyl sulfide and the organic sulfoxide is methyl octyl sulfoxide.

17. The process of claim 1 in which the organic sulfide is methyl dodecyl sulfide and the organic sulfoxide is methyl dodecyl sulfoxide.

18. The process of claim 1 in which the organic sulfide is 3-n-decyl-2,5-dithiahexane and the organic sulfoxide is 3-n-decyl-2,5-dithiahexane-bis-2,5-sulfoxide.

19. A cyclic process for the manufacture of dimethyl sulfoxide and dimethyl sulfone which comprises the steps of:

(a) adding dimethyl sulfide to a solution of nitrogen tetroxide in methylene dichloride, the quantity of dimethyl sulfide being not in excess of one mole for each mole of nitrogen tetroxide employed, to form nitrogen trioxide and a mixture of dimethyl sulfoxide with a minor amount of dimethyl sulfone;

(b) distilling off the resultant solution of nitrogen trioxide and methylene dichloride and condensing said distillate in the presence of an oxygen-containing gas in quantity sufficient to oxidize substantially all of the nitrogen trioxide to nitrogen tetroxide;

(c) recovering the dimethyl sulfoxide and the dimethyl sulfone from the residue of said distillation by fractionation, and (d) recycling the oxidizing solution of nitrogen tetroxide in methylene dichloride regenerated in step (b) of said process to step (a) of said process.

References Cited in the file of this patent

UNITED STATES PATENTS

| | | |
|---|---|---|
| 2,581,050 | Smedslund | Jan. 2, 1952 |
| 2,702,824 | Wetterholm et al. | Feb. 22, 1955 |